(12) United States Patent
Nakajima et al.

(10) Patent No.: US 6,195,481 B1
(45) Date of Patent: Feb. 27, 2001

(54) ARRAY WAVEGUIDE DIFFRACTION GRATING OPTICAL MULTIPLEXER/DEMULTIPLEXER

(75) Inventors: Takeshi Nakajima; Hiroyuki Koshi, both of Ichihara; Naoki Hashizume, Yokohama, all of (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 09/509,832
(22) PCT Filed: Aug. 23, 1999
(86) PCT No.: PCT/JP99/04522
§ 371 Date: Apr. 21, 2000
§ 102(e) Date: Apr. 21, 2000
(87) PCT Pub. No.: WO00/11508
PCT Pub. Date: Feb. 3, 2000

(30) Foreign Application Priority Data

Aug. 24, 1998 (JP) .................................. 10-237440

(51) Int. Cl.$^7$ .................................................. G02B 6/36
(52) U.S. Cl. .............................................. 385/24; 359/115
(58) Field of Search ................................. 385/24, 11, 43, 385/31, 37, 39, 50, 14; 372/6, 92; 359/115, 124, 333, 120, 344, 349; 438/286, 156, 289, 293

(56) References Cited

U.S. PATENT DOCUMENTS

| 5,523,879 | * | 6/1996 | Ota et al. | 359/333 |
| 5,570,228 | * | 10/1996 | Ota et al. | 359/333 |
| 5,773,345 | * | 5/2000 | Ota et al. | 438/288 |
| 5,799,118 | * | 8/1998 | Ogusu et al. | 385/14 |
| 5,892,604 | * | 4/1999 | Yamanaka et al. | 359/128 |
| 5,923,683 | * | 7/1999 | Morioka et al. | 372/6 |
| 5,937,113 | * | 8/1999 | He et al. | 385/11 |
| 6,069,990 | * | 5/2000 | Okawa et al. | 385/43 |

FOREIGN PATENT DOCUMENTS

| 4-326308 | 11/1992 | (JP) . |
| 6-250030 | 9/1994 | (JP) . |
| 7-301721 | 11/1995 | (JP) . |
| 8-122557 | 5/1996 | (JP) . |
| 10-73730 | 3/1998 | (JP) . |
| 10-274719 | 10/1998 | (JP) . |

OTHER PUBLICATIONS

U.S. application No. 09/509,832, filed Apr. 21, 2000, pending.
U.S. application No. 09/509,084, filed Jun. 22, 2000, Pending.
H. Uetsuka, et al., IEICE Trans. Electron, vol. E80–C, No. 5, pp. 619–624, "Wavelength Division Multi/Demultiplexer with Arrayed Waveguide Grating," May 1997.

* cited by examiner

Primary Examiner—Akm E. Ullah
(74) Attorney, Agent, or Firm—Oblon, Spivak, McClelland, Maier & Neustadt, P.C.

(57) ABSTRACT

An arrayed waveguide grating type optical multiplexer/demultiplexer includes input waveguides, an input-side slab waveguide, an arrayed waveguide diffraction grating, an output-side slab waveguide, and output waveguides. A junction between each input waveguide and the input-side slab waveguide is tapered such that the end portion of the input waveguide gradually widens in the width direction of the path toward the input-side slab waveguide, and includes two separate small-width waveguide portions arranged separately from the end portion of the input waveguide and extending in a line with taper of the tapered end portion, and a single large-width waveguide portion arranged separately from the small-width waveguide portions.

4 Claims, 8 Drawing Sheets

LOCATION ALONG WIDTH JUST IN FRONT
OF LARGE-WIDTH WAVEGUIDE PORTION

FIG. 6

LOCATION ALONG WIDTH JUST IN FRONT
OF INPUT-SIDE SLAB WAVEGUIDE

LOCATION ALONG WIDTH JUST IN FRONT
OF INPUT-SIDE SLAB WAVEGUIDE

LOCATION ALONG WIDTH JUST IN FRONT
OF INPUT-SIDE SLAB WAVEGUIDE

FIG. 13

ARRAY WAVEGUIDE DIFFRACTION GRATING OPTICAL MULTIPLEXER/DEMULTIPLEXER

TECHNICAL FIELD

The present invention relates to an arrayed waveguide grating type optical multiplexer/demultiplexer used in optical wavelength devision multiplexing communications, and more particularly, to an arrayed waveguide grating type optical multiplexer/demultiplexer of which the spectrum response at output waveguides shows satisfactory flatness in the vicinity of a center wavelength and which ensures high yield during manufacture.

BACKGROUND ART

Recently, in the field of optical communications, researches have been intensively made on optical frequency devision multiplexing communication techniques for transmitting through a single optical fiber a plurality of sets of information at different wavelengths of light, in order to greatly increase the information transmission capacity. To attain such multiplexing communications, an optical multiplexer/demultiplexer is needed which multiplexes and demultiplexes a large number of light waves used.

The optical multiplexer/demultiplexer used for such applications is required to have the performance stated below.

First, using a large number of light waves with the narrowest possible wavelength spacing is effective in increasing the information transmission capacity, and therefore, the optical multiplexer/demultiplexer should be able to multiplex and demultiplex such a large number of light waves. For example, the multiplexer/demultiplexer is required to multiplex and demultiplex light waves with 100 GHz frequency spacing, which is equivalent approximately to 0.8 nm wavelength spacing in 1.55 µm band.

The optical multiplexer/demultiplexer is also required to have satisfactory passband flatness in the vicinity of passing wavelength.

For example, where an inexpensive LD is used as a light source in constructing an optical frequency devision multiplexing communication system with a view to reducing costs, the oscillation wavelength of the light source is liable to change with time or due to variations in temperature or humidity of the environment in which the light source is used. If the oscillation wavelength of the light source undergoes such a change, a loss variation occurs when light is propagated through the optical multiplexer/demultiplexer in the system, by an amount corresponding to the wavelength change depending on the spectrum response of the multiplexer/demultiplexer. The loss variation not only deteriorates the loss uniformity among wavelengths to be multiplexed/demultiplexed but also the S/N ratio, and eventually increases the cost of constructing the system.

In view of the foregoing, the loss variation of the optical multiplexer/demultiplexer should preferably be as small as possible. The optical multiplexer/demultiplexer is therefore required to have a characteristic such that the loss variation is, for example, 1 dB or less, that is, 1 dB bandwidth is large.

As such optical multiplexer/demultiplexer, an arrayed waveguide grating type is disclosed in Unexamined Japanese Patent Publication (KOKAI) No. 8-122557.

Figure 8:
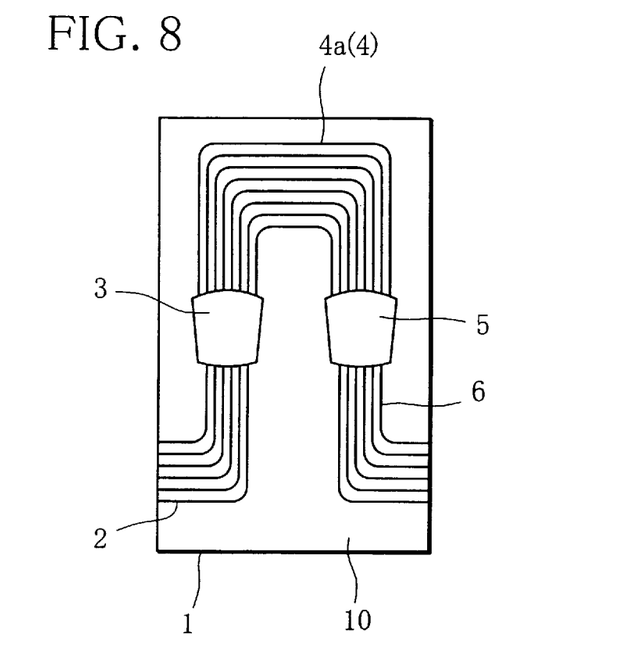
FIG. 8 is a schematic plan view of a conventional optical multiplexer/demultiplexer.

FIG. 8 is a plan view schematically showing the optical multiplexer/demultiplexer. This multiplexer/demultiplexer has a substrate 1 on which are arranged one or a plurality of input waveguides 2, an input-side slab waveguide 3 connected to the input waveguide(s) 2, a diffraction grating 4 connected to the input-side slab waveguide 3 and comprising a plurality of arrayed channel waveguides 4a, an output-side slab waveguide 5 connected to the arrayed waveguide grating 4, and a plurality of output waveguides 6 connected to the output-side slab waveguide 5.

Figure 9:
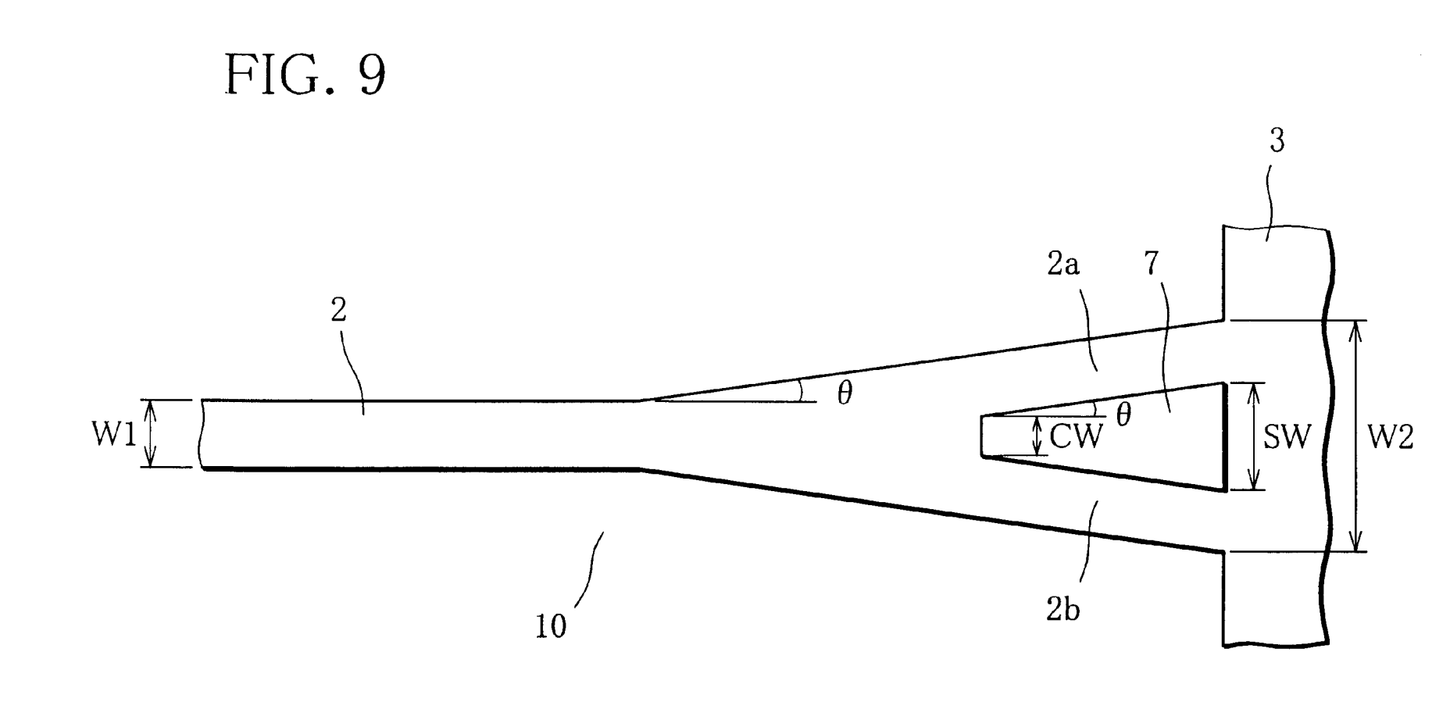
FIG. 9 is a plan view showing a connecting portion of the optical multiplexer/demultiplexer shown in FIG. 8.

In this optical multiplexer/demultiplexer, the junction between the input waveguide 2 and the input-side slab waveguide 3 is formed as shown in FIG. 9.

Specifically, the input waveguide 2, which is surrounded by a cladding material 10 and has a path width W1, has a tapered end portion expanded in the width direction of the path, and a slit 7 is formed in the center of the tapered portion, thus defining two waveguide portions 2a and 2b of equal width. The input waveguide 2 is connected to the input-side slab waveguide 3 at the tapered portion, or the two waveguide portions 2a and 2b.

In the input waveguide 2 constructed in this manner, light propagated through the input waveguide 2 enters the input-side slab waveguide via the tapered portion. At this time, the two waveguide portions 2a and 2b of the tapered portion equivalently function as a core. Consequently, at a location just in front of the input-side slab waveguide 3, the electric field distribution of light is spread as a whole in the width direction and has a bimodal shape with two maximal values.

This optical multiplexer/demultiplexer is allegedly capable of attaining 3 dB bandwidth of about 0.8 nm with respect to about 1 nm wavelength spacing.

In the prior art device, however, almost no consideration is given to the passband flatness of light output from the output waveguides 6, or more specifically, to 1 dB bandwidth which is an important characteristic when the optical multiplexer/demultiplexer is applied to an actual optical frequency devision multiplexing communication system.

The inventors hereof therefore actually fabricated an optical multiplexer/demultiplexer as shown in FIGS. 8 and 9 and examined its spectrum response.

Specifically, an optical multiplexer/demultiplexer with silica-based waveguides was produced, wherein the input waveguide 2 had a path width W1 of 6.5 µm, the connecting portion of the input-side slab waveguide 3 had a width W2 of 15.0 µm, the trapezoidal slit 7 had a connection width CW of 1.0 µm on the input waveguide 2 side and a connection width SW of 2.0 µm on the slab waveguide 3 side, the tapered portion was tapered at an angle θ of 0.4°, and the waveguides had a relative index difference of 0.8% and a path height of 6.5 µm, to derive light with 100 GHz wavelength spacing, that is, about 0.8 nm wavelength spacing in 1.55 µm band. With light of 1.55 µm band input to the input waveguide 2, the spectrum response was examined.

Figure 10:
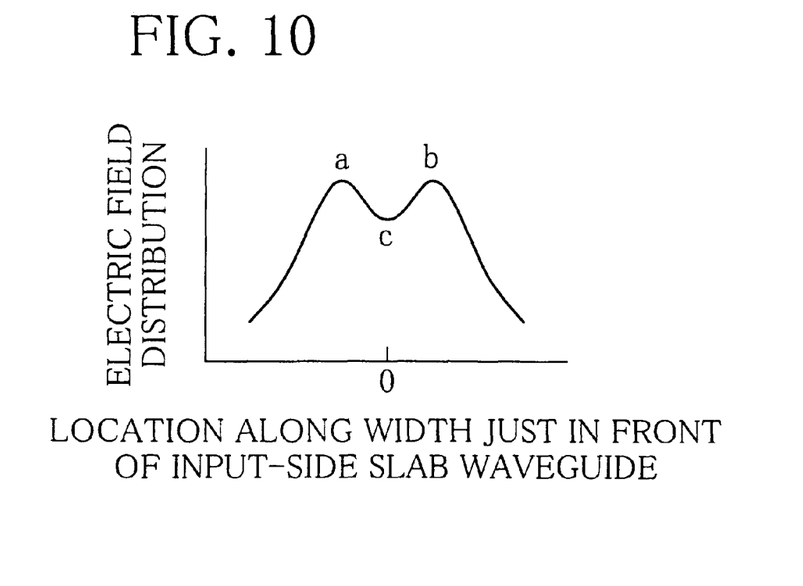
FIG. 10 is a graph showing an electric field distribution of light at a location just in front of an input-side slab waveguide.
Figure 11:
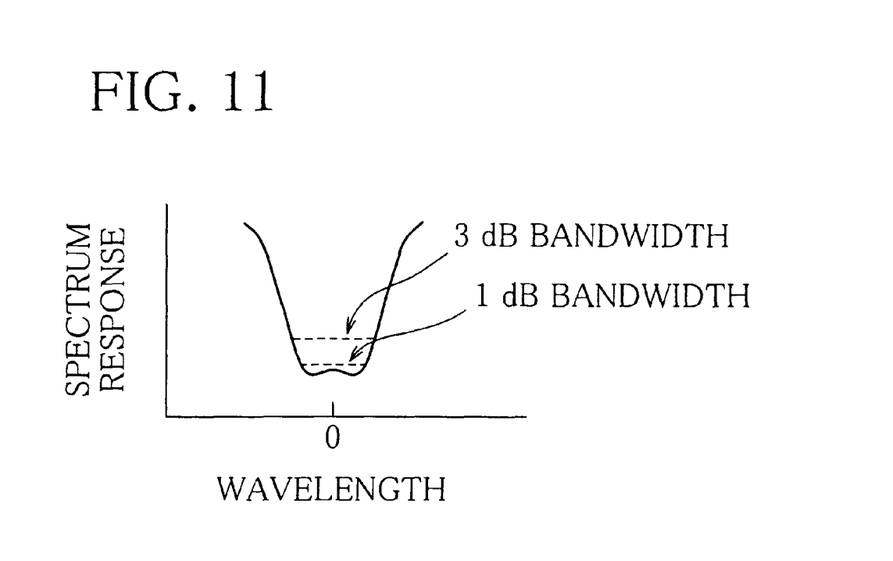
FIG. 11 is a graph showing a spectrum response at an output waveguide.

FIG. 10 shows the electric field distribution of light observed at a location just in front of the input-side slab waveguide 3, and FIG. 11 shows the spectrum response at the output waveguide 6.

In FIG. 10, the horizontal axis represents the width direction of the path at a location immediately in front of the input-side slab waveguide 3, and the position "0" indicates the center along the width direction, that is, the center point of the width W2 shown in FIG. 9. In FIG. 11, the horizontal axis represents wavelength of light propagated through the output waveguide 6, and the position "0" indicates the center wavelength of the propagated light.

To actually measure the electric field distribution, the fabricated optical multiplexer/demultiplexer must be destroyed, but in the experimentation, the electric field distribution was estimated/calculated by means of simulation according to beam propagation method (BPM), instead of destroying the device.

As is clear from FIG. 10, the electric field distribution showed a bimodal shape having maximal values a and b and a minimal value c therebetween. The spacing between the two maximal values a and b was 7.0 μm and the ratio c/a was 0.59.

With regard to the spectrum response, 1 dB bandwidth, which is a wavelength range 1 dB higher than a minimum insertion loss, was found to be 0.37 nm, and 3 dB bandwidth was 0.50 nm.

In the aforementioned Unexamined Japanese Patent Publication No. 8-122557, it is stated that 3 dB bandwidth can be further increased by setting the ratio SW/W2 of the junction between the input waveguide and the input-side slab waveguide shown in FIG. 9 to 0.2 to 0.6.

The inventors therefore fabricated an optical multiplexer/demultiplexer with a junction having the same parameters as the aforesaid ones, except that the connection width SW of the junction shown in FIG. 9 was set to 3.0 μm, and measured the electric field distribution and the spectrum response under the same conditions. The junction of the fabricated multiplexer/demultiplexer had an SW/W2 ratio of 0.2.

Figure 12:
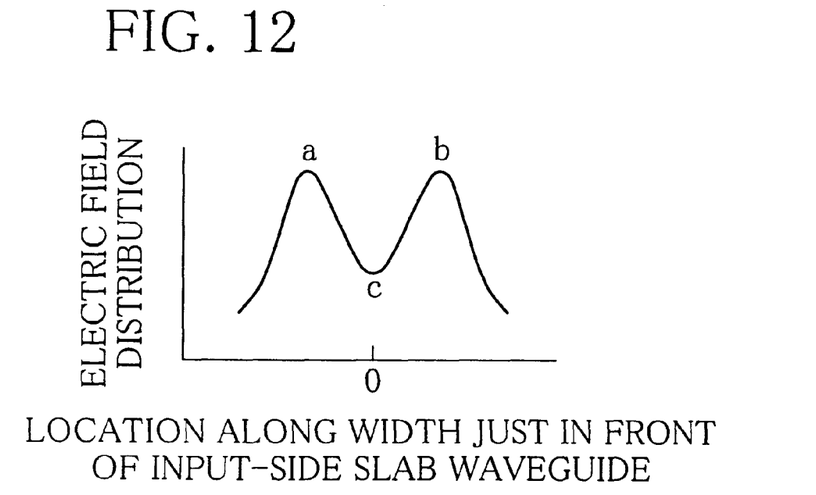
FIG. 12 is a graph showing another electric field distribution of light at a location just in front of the input-side slab waveguide.
Figure 13:
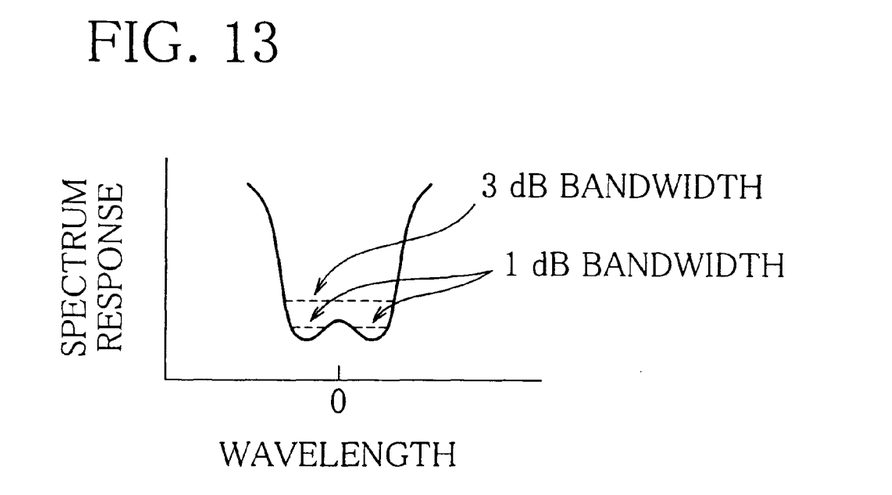
FIG. 13 is a graph showing another spectrum response at the output waveguide.

FIG. 12 shows the electric field distribution of light observed at a location just in front of the input-side slab waveguide, and FIG. 13 shows the spectrum response of light from the output waveguide.

In this device, the spacing between the maximal values a and b shown in FIG. 12 was 10.3 μm, which is greater than the spacing (7.0 μm) observed in the case of FIG. 10. However, the ratio c/a was 0.27, showing an increased difference between the maximal and minimal values in the electric field distribution. Also, in the spectrum response shown in FIG. 13, 3 dB bandwidth was 0.63 nm, which is greater than the value (0.5 nm) observed in the case of FIG. 11. However, the flatness of the output light was so poor that the insertion loss at the center wavelength was higher than the minimum loss by more than 1 dB, dividing 1 dB bandwidth into two with the center wavelength missing. Namely, 1 dB bandwidth failed to be widened.

The foregoing reveals the following.

(1) Where the electric field distribution of light at a location immediately in front of the input-side slab waveguide is made to have a bimodal shape with increased spacing between the maximal values a and b, 3 dB bandwidth of the spectrum response increases.

(2) If, in such a bimodal electric field distribution of light at a location immediately in front of the input-side slab waveguide, the difference between the maximal and minimal values is large, the spectrum response of the output waveguide shows increased insertion loss at the center wavelength, with the result that 1 dB bandwidth divides into two with no center wavelength.

The fact (2) poses a serious problem when the optical multiplexer/demultiplexer is used in constructing an optical frequency devision multiplexing communication system, as mentioned above.

Thus, although the optical multiplexer/demultiplexer disclosed in Unexamined Japanese Patent Publication No. 8-122557 is effective in widening 3 dB passing bandwidth, it is still associated with a problem that 1 dB bandwidth fails to be widened satisfactorily.

Also, in this optical multiplexer/demultiplexer, the slit structure formed at the junction between the input waveguide and the input-side slab waveguide for transforming an electric field distribution of the input light into bimodal shape has a Y-branch configuration constructed in closed space. It is therefore difficult to form the slit structure with high precision, thus lowering the yield during manufacture.

An object of the present invention is to provide an arrayed waveguide grating type optical multiplexer/demultiplexer which solves the aforementioned problems with the optical multiplexer/demultiplexer disclosed in Unexamined Japanese Patent Publication No. 8-122557 and whose 3 dB and 1 dB bandwidths can both be widened, compared with the prior art optical multiplexer/demultiplexer. Another object of the present invention is to provide an arrayed waveguide grating type optical multiplexer/demultiplexer which ensures high yield during manufacture, compared with the prior art optical multiplexer/demultiplexer.

DISCLOSURE OF THE INVENTION

To achieve the above objects, the present invention provides an arrayed waveguide grating type optical multiplexer/demultiplexer comprising: an input waveguide; an input-side slab waveguide connected to an end portion of the input waveguide; a diffraction grating including arrayed channel waveguides connected to the input-side slab waveguide; an output-side slab waveguide connected to the arrayed waveguide diffraction grating; and output waveguides having end portions connected to the output-side slab waveguide, wherein a junction between the input waveguide and the input-side slab waveguide or between each output waveguide and the output-side slab waveguide is tapered in a manner such that the end portion of the input or output waveguide gradually widens in a width direction of path toward the input-side or output-side slab waveguide, and the junction includes two separate small-width waveguide portions separate from the end portion of the input or output waveguide and extending in a line with taper of the tapered end portion, and a single large-width waveguide portion separate from the small-width waveguide portions.

The large-width waveguide portion constituting the junction may be formed integrally with an input end portion of the input-side slab waveguide or with an output end portion of the output-side slab waveguide.

Alternatively, the large-width waveguide portion may be arranged separately from the input end portion of the input-side slab waveguide or from the output end portion of the output-side slab waveguide.

The present invention also provides an arrayed waveguide grating type optical multiplexer/demultiplexer comprising: an input waveguide; an input-side slab waveguide connected to an end portion of the input waveguide; a diffraction grating including arrayed channel waveguides connected to the input-side slab waveguide; an output-side slab waveguide connected to the arrayed waveguide diffraction grating; and output waveguides having end portions connected to the output-side slab waveguide, wherein a junction between the input waveguide and the input-side slab waveguide or between each output waveguide and the output-side slab waveguide is provided with input means or output means for transforming an electric field distribution of light into bimodal shape in a width direction perpendicular to a propagation direction of light at a location immediately in front of the input-side slab waveguide or immediately behind the output-side slab waveguide, and a connecting portion between the input means and the input-side slab waveguide or between the output means and the output-side slab waveguide is provided with a waveguide for obtaining a bimodal electric field distribution with a shallower central trough than that of the first-mentioned bimodal electric field distribution.

Figure 1:
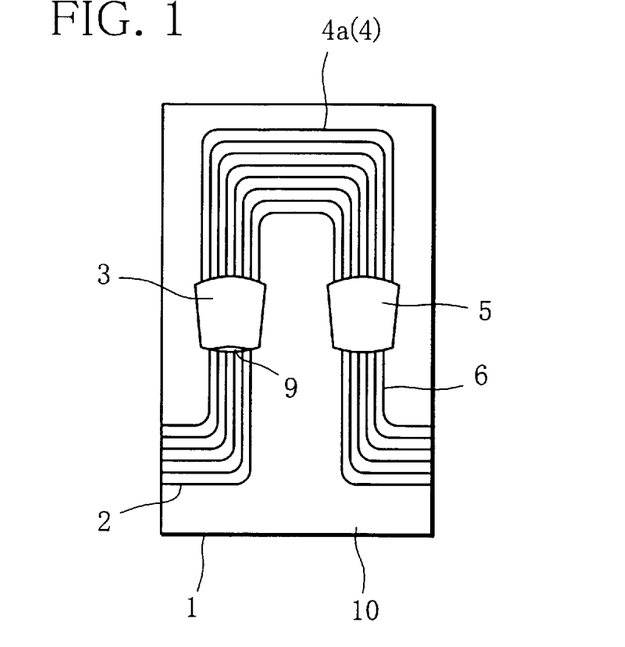
FIG. 1 is a schematic plan view of an optical multiplexer/demultiplexer according to the present invention.
Figure 2:
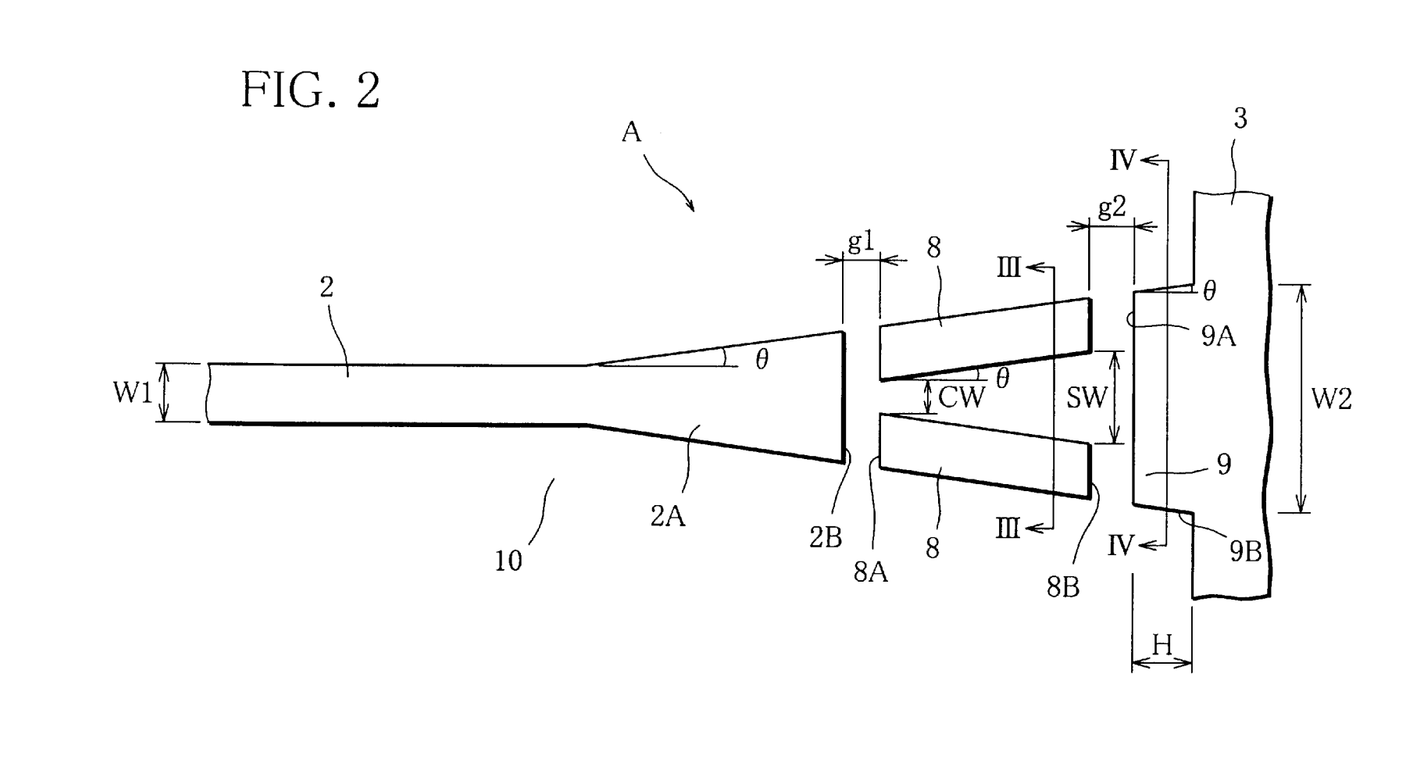
FIG. 2 is a plan view showing a junction A of the optical multiplexer/demultiplexer according to the present invention.

FIG. 1 is a schematic plan view showing an example of an optical multiplexer/demultiplexer according to the present invention, and FIG. 2 is a plan view showing Example A of junction between an input waveguide and an input-side slab waveguide.

In the optical multiplexer/demultiplexer according to the present invention, waveguides formed on a substrate 1 are buried in a cladding material 10 with low refractive index, the waveguides including one or a plurality of input waveguides 2 having an end portion(s) connected to an input-side slab waveguide 3, a diffraction grating 4 consisting of arrayed channel waveguides 4a connected to the input-side slab waveguide 3, an output-side slab waveguide 5 connected to the arrayed waveguide grating 4, and a plurality of output waveguides 6 having end portions connected to the output-side slab waveguide 5. This structure is identical with that of the optical multiplexer/demultiplexer of FIG. 8, disclosed in Unexamined Japanese Patent Publication No. 8-122557.

The principal feature of the present invention is as follows.

As shown in FIG. 2, the input waveguide 2 with a path width W1 has a tapered end portion 2A which gradually expands in the width direction of the path at an angle θ with respect to an optical axis, and the tapered portion has a distal end face 2B perpendicular to the optical axis.

Two separate small-width waveguide portions 8, 8 are arranged near the end face 2B with a gap g1 therebetween.

Figure 3:
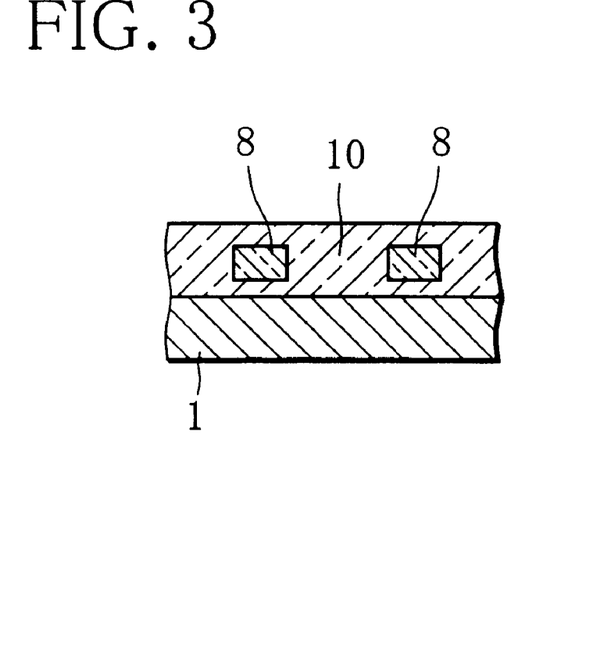
FIG. 3 is a sectional view taken along line III—III in FIG. 2.

Specifically, as shown in FIG. 3 which is a sectional view taken along line III—III in FIG. 2, the two small-width waveguide portions 8, 8 are arranged in a manner buried in the cladding material 10.

The small-width waveguide portions 8, 8 have respective end faces 8A parallel to the end face 2B and extend toward the input-side slab waveguide 3 at an angle θ equal to the angle θ at which the tapered end portion 2A of the input waveguide is tapered. The small-width waveguide portions 8, 8 have distal end faces 8B parallel to the end faces 8A.

The input-side slab waveguide 3, which is located next to the small-width waveguide portions 8, 8 in the direction of propagation of light, has a large-width waveguide portion 9 protruding therefrom toward the end faces 8B of the small-width waveguide portions 8, 8 and having a trapezoidal shape with a length H in plan view. The large-width waveguide portion 9 serves as a connecting portion for the small-width waveguide portions 8, 8.

Figure 4:
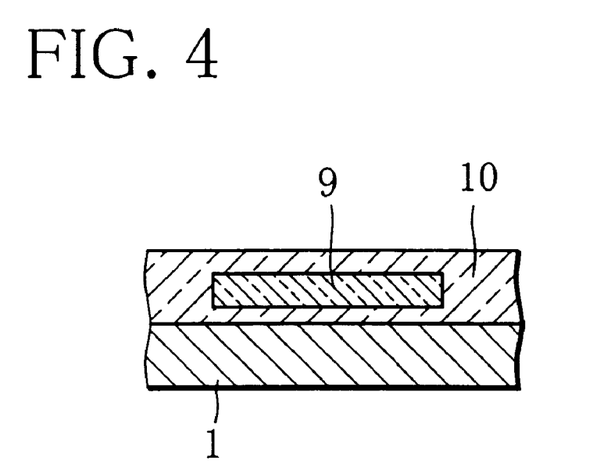
FIG. 4 is a sectional view taken along line IV—IV in FIG. 2.

The large-width waveguide portion 9 is formed as an input end portion of the input-side slab waveguide such that it is entirely buried in the cladding material 10, as shown in FIG. 4 which is a sectional view taken along line IV—IV in FIG. 2.

The large-width waveguide portion 9 has an end face 9A separated from the end faces 8B of the small-width waveguide portions 8, 8 with a gap g2 therebetween, and has side faces 9B inclined at an angle equal to the aforementioned taper angle θ.

Where the input waveguide 2 is one in number, it is connected to the input-side slab waveguide by means of one set of junction consisting of the two small-width waveguide portions 8, 8 and the large-width waveguide portion 9. On the other hand, where there are provided a plurality of input waveguides 2, each of the input waveguides is connected by means of such junction.

With the junction A constructed in this manner, the optical power propagated through the input waveguide 2 is spread in the width direction in the tapered portion 2A, then propagated through the two small-width waveguide portions 8, 8, and input to the large-width waveguide portion 9 to be propagated through the input-side slab waveguide 3.

Figure 5:
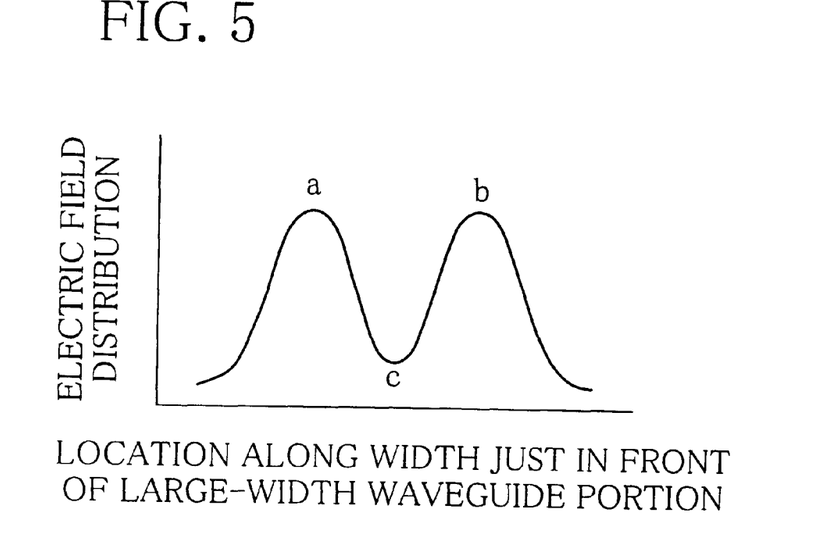
FIG. 5 is a graph showing an electric field distribution of light at a location just in front of a large-width waveguide portion of the optical multiplexer/demultiplexer according to the present invention.

At the junction A, the two small-width waveguide portions 8, 8 are buried in the cladding material 10 with low refractive index. Consequently, after passing through the tapered portion 2A of the input waveguide 2 and the small-width waveguide portions 8, 8, the light shows a bimodal electric field distribution having a deep trough in a central portion c thereof, as shown in FIG. 5, at a location immediately behind the small-width waveguide portions 8, 8.

Also, the junction A has the gaps g1 and g2 respectively between the end portion 2A of the input waveguide and each small-width waveguide portion 8 and between each small-width waveguide portion 8 and the large-width waveguide portion 9. Accordingly, the light confinement effect is lost at each of these gaps, producing a light diffraction effect, and thus the light comes to have a bimodal electric field distribution having a slightly shallower trough with the minimal value c relatively increased, and falls upon the large-width waveguide portion 9 to be propagated therethrough. Namely, the large-width waveguide portion 9 serves as a connecting portion for connecting the input waveguide 2 to the input-side slab waveguide 3 or a connecting portion for connecting the output-side slab waveguide 5 to the output waveguide 6.

Figure 6:
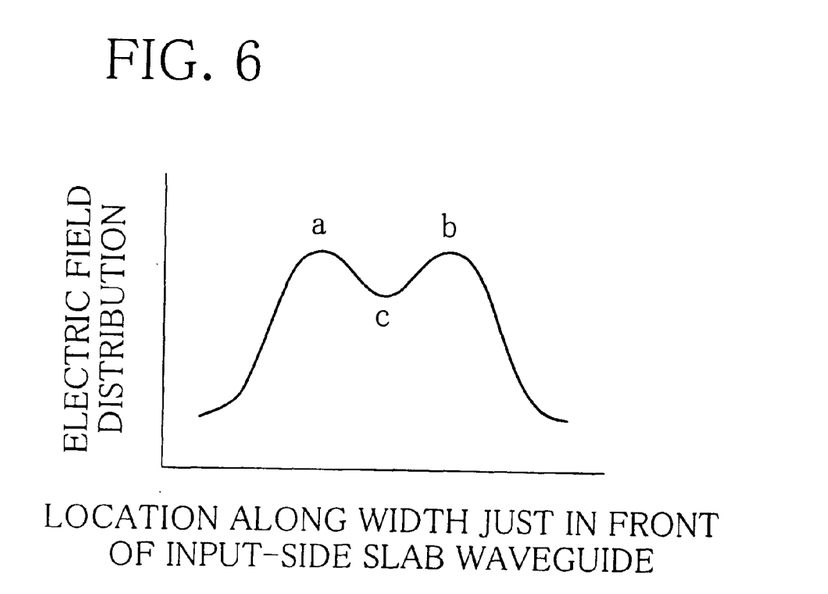
FIG. 6 is a graph showing an electric field distribution of light at a location just in front of an input-side slab waveguide of the optical multiplexer/demultiplexer according to the present invention.

The large-width waveguide portion 9, which is a high refractive index layer, functions as a three-dimensional waveguide and the light having the aforementioned minimal value c in its electric field distribution is propagated through this waveguide portion 9. Consequently, as the light having the bimodal electric field distribution with a deep center trough as shown in FIG. 5 is propagated through the large-width waveguide portion 9, the minimal value c at the center trough relatively increases and the light eventually comes to have an electric field distribution with a reduced difference between its maximal and minimal values, as shown in FIG. 6, at a location just in front of the input-side slab waveguide 3. The spectrum response at the output waveguide therefore shows satisfactory flatness in the vicinity of the center wavelength.

Since the junction A is provided with the gaps g1 and g2 variations in shape of the individual waveguides can be lessened when the waveguides are formed by etching, and thus high yield can be attained compared with the case of forming slits during the manufacture of the conventional optical multiplexer/demultiplexer shown in FIG. 9.

As described above, in the optical multiplexer/demultiplexer according to the present invention, the junction between the input waveguide and the input-side slab waveguide is provided with input means, or the small-width waveguide portions, for transforming the electric field distribution of light into bimodal shape, and also with the large-width waveguide portion for shallowing the center trough in the bimodal electric field distribution, whereby the spectrum response at the output waveguide can be flattened in the vicinity of the center wavelength.

Figure 7:
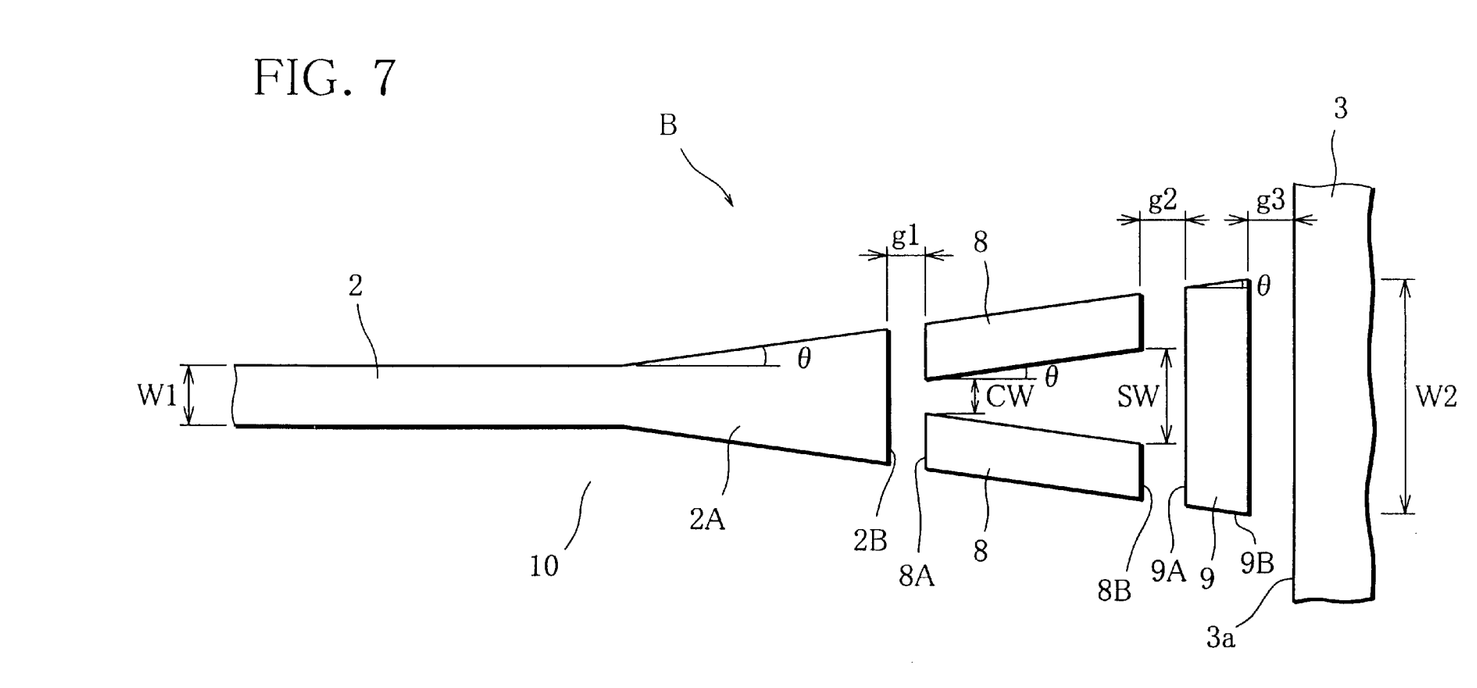
FIG. 7 is a plan view showing another junction B of an optical multiplexer/demultiplexer according to the present invention.

FIG. 7 illustrates another junction B according to the present invention.

As distinct from the junction A described above, the junction B has a structure wherein the large-width waveguide portion 9 is separated at a distance of a gap g3 from an input end portion 3a of the input-side slab waveguide 3. Also with this structure, the difference between maximal and minimal values of the bimodal electric field distribution of light is reduced at a location immediately in front of the input-side slab waveguide 3, whereby the flatness of pass band improves.

The foregoing description is given with reference to the case where the aforementioned junction is provided between the input waveguide and the input-side slab waveguide, but also in the case where the junction is provided between the output-side slab waveguide and the output waveguide, the optical multiplexer/demultiplexer of the present invention can perform a similar function.

BEST MODE OF CARRYING OUT THE INVENTION

EXAMPLE 1

An optical multiplexer/demultiplexer as shown in FIGS. 1 and 2 was fabricated on an Si substrate by using a combination of flame hydrolysis deposition, photolithography and etching such that 100 GHz wavelength spacing, that is, about 0.8 nm wavelength spacing in 1.55 $\mu$m band, was obtained.

Specifically, a lower cladding layer (main component: $SiO_2$) and a core layer ($SiO_2$ as a main component admixed with Ti) were successively formed by flame hydrolysis deposition on the Si substrate, and the entire structure was heated so as to change into transparent glass. Subsequently, the core layer was dry-etched using a photomask, and after an upper cladding layer (main component: $SiO_2$) was formed by flame hydrolysis deposition such that the dry-etched core layer was buried therein, the structure was heated so as to change the upper cladding layer into transparent glass, thereby obtaining an optical multiplexer/demultiplexer.

The optical multiplexer/demultiplexer had a junction A configured as stated below.

The input waveguide 2 had a path width W1 of 6.5 $\mu$m, and the large-width waveguide portion 9 had a width W2 of 15.0 $\mu$m and a protrusion length H of 30 $\mu$m. The taper angle θ of the individual elements was 0.40°, a distance CW between the end faces 8A of the small-width waveguide portions was 3.0 $\mu$m, a distance SW between the end faces 8B of the same waveguide portions was 3.5 $\mu$m, and the gaps g1 and g2 were both 5.0 $\mu$m. The individual waveguides had a relative index difference of 0.8% and a path height of 6.5 $\mu$m.

With light of 1.55 $\mu$m wavelength band input to the input waveguide 2, the spectrum response was examined.

First, the electric field distribution of light at a location immediately in front of the input-side slab waveguide 3 was observed by means of simulation according to beam propagation method, and it had a bimodal shape identical with that shown in FIG. 6. The spacing between the maximal values a and b was 11.7 $\mu$m and the ratio c/a was 0.64, showing a shallow trough at the minimal value.

The spectrum response at the output waveguide showed a small loss in the vicinity of the center wavelength and was flat as a whole. The 3 dB bandwidth was 0.59 nm and the 1 dB bandwidth was 0.47 nm.

EXAMPLE 2

An optical multiplexer/demultiplexer was produced which had a junction B whose gap g3 was 5 $\mu$m and whose other parameters were identical with those of the aforementioned junction A.

With regard to this optical multiplexer/demultiplexer, the electric field distribution of light just in front of the input-side slab waveguide and the spectrum response were examined in the same manner as in Example 1.

In the observed electric field distribution of light, the spacing between the maximal values a and b was 11.8 $\mu$m and the ratio c/a was 0.63. The 3 dB bandwidth was 0.60 nm and the 1 dB bandwidth was 0.48 nm.

Industrial Applicability

In the arrayed waveguide grating type optical multiplexer/demultiplexer according to the present invention, the electric field distribution of light shows a bimodal shape at a location immediately in front of the input-side slab waveguide and yet the difference between the maximal and minimal values is small, so that the spectrum response has satisfactory flatness. As a consequence, both the 3 dB bandwidth and the 1 dB bandwidth can be made wider than in the case of the conventional arrayed waveguide grating type optical multiplexer/demultiplexer.

Accordingly, the optical multiplexer/demultiplexer has high industrial value as a component to be used in constructing an optical frequency devision multiplexing communication system.

What is claimed is:

1. An arrayed waveguide grating type optical multiplexer/demultiplexer comprising:

an input waveguide;

an input-side slab waveguide connected to an end portion of said input waveguide;

a diffraction grating including arrayed channel waveguides connected to said input-side slab waveguide;

an output-side slab waveguide connected to said arrayed waveguides diffraction grating; and output waveguides having end portions connected to said output-side slab waveguide, wherein a junction between said input waveguide and said input-side slab waveguide or between each said output waveguide and said output-side slab waveguide is tapered in a manner such that the end portion of said input or output waveguides gradually widens in a width direction of path toward said input-side or output-side slab waveguide, and the junction includes two separate small-width waveguide portions separate from the end portion of said input or output waveguide and extending in a line with taper of the tapered end portion, and a single large-width waveguide portion separate from the small-width waveguide portions.

2. The arrayed waveguide grating type optical multiplexer/demultiplexer according to claim 1, wherein said large-width waveguide portion constituting the junction is formed continuously with an input end portion of said input-side slab waveguide or with an output end portion of said output-side slab waveguide.

3. The arrayed waveguide grating type optical multiplexer/demultiplexer according to claim 1, wherein said large-width waveguide portion constituting the junction is arranged separately from an input end portion of said input-side slab waveguide or from an output end portion of said output-side slab waveguide.

4. An arrayed waveguide grating type optical multiplexer/demultiplexer comprising:

an input waveguide;

an input-side slab waveguide connected to an end portion of said input waveguide;

a diffraction grating including arrayed channel waveguides connected to said input-side slab waveguide;

an output-side slab waveguide connected to said arrayed waveguide diffraction grating; and output waveguides having end portions connected to said output-side slab waveguide, wherein a junction between said input waveguide and said input-side slab waveguide or between each said output waveguide and said output-side slab waveguide is provided with input means or output means for transforming an electric field distribution of light into bimodal shape in a width direction perpendicular to a propagation direction of light at a location immediately in front of said input-side slab waveguide or immediately behind said output-side slab waveguide, and a connecting portion between the input means and said input-side slab waveguide or between the output means and said output-side slab waveguide is provided with a waveguide for obtaining a bimodal electric field distribution with a shallower central trough than that of the first-mentioned bimodal electric field distribution.

* * * * *

UNITED STATES PATENT AND TRADEMARK OFFICE
CERTIFICATE OF CORRECTION

PATENT NO. : 6,195,481 B1
DATED : February 27, 2001
INVENTOR(S) : Takeshi Nakajima, et al.

It is certified that error appears in the above-identified patent and that said Letters Patent is hereby corrected as shown below:

<u>Title page,</u>
Item (87), the PCT Published Date is incorrect.

Item (87) should read:
--(87) PCT Pub. No.: WO00/11508
    PCT Pub. Date: Mar. 2, 2000--

Signed and Sealed this

Fourteenth Day of August, 2001

*Attest:*

*Attesting Officer*

NICHOLAS P. GODICI
*Acting Director of the United States Patent and Trademark Office*